(12) United States Patent
Geng et al.

(10) Patent No.: US 11,425,475 B2
(45) Date of Patent: Aug. 23, 2022

(54) RANGING METHOD AND REGISTRATION METHOD FOR OPTICAL NETWORK, OLT, ONU, AND OPTICAL NETWORK SYSTEM

(71) Applicant: ZTE Corporation, Shenzhen (CN)

(72) Inventors: Dan Geng, Shenzhen (CN); Weiliang Zhang, Shenzhen (CN); Liquan Yuan, Shenzhen (CN); Zhuang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/279,432

(22) PCT Filed: Sep. 24, 2019

(86) PCT No.: PCT/CN2019/107502
§ 371 (c)(1),
(2) Date: Mar. 24, 2021

(87) PCT Pub. No.: WO2020/063582
PCT Pub. Date: Apr. 2, 2020

(65) Prior Publication Data
US 2021/0409850 A1 Dec. 30, 2021

(30) Foreign Application Priority Data
Sep. 25, 2018 (CN) .......................... 201811115958.X

(51) Int. Cl.
*H04Q 11/00* (2006.01)
*H04B 10/25* (2013.01)
*H04L 5/00* (2006.01)

(52) U.S. Cl.
CPC ..... *H04Q 11/0067* (2013.01); *H04B 10/2589* (2020.05); *H04L 5/0053* (2013.01); *H04Q 2011/0064* (2013.01); *H04Q 2011/0088* (2013.01)

(58) Field of Classification Search
CPC .......................... H04Q 11/0067; H04Q 3/0066
See application file for complete search history.

(56) References Cited

U.S. PATENT DOCUMENTS 7,027,730 B2 * 4/2006 Nagayama ....... H04B 10/07955
398/37
2020/0350992 A1 * 11/2020 Liu .................. H04B 10/25

FOREIGN PATENT DOCUMENTS

| CN | 101997605 A | 3/2011 |
| CN | 102739305 A | 10/2012 |
| CN | 110086545 A | 8/2019 |

(Continued)

OTHER PUBLICATIONS

International Search Report for corresponding application PCT/CN2019/107502 filed Sep. 24, 2020; dated Dec. 25, 2019.

*Primary Examiner* — Shi K Li
(74) *Attorney, Agent, or Firm* — Cantor Colburn LLP

(57) ABSTRACT

The present disclosure provides a ranging method and a registration method for an optical network, an Optical Line Terminal (OLT), an Optical Network Unit (ONU), and an optical network system. An OLT groups ONUs controlled by the OLT according to receiving optical power values of the ONUs. The OLT allocates corresponding uplink bandwidths to the ONUs in different groups, the uplink bandwidths being used to send registration information by the ONUs to be registered.

15 Claims, 2 Drawing Sheets

An ONU receives a broadcast message sent by an OLT, the broadcast message carrying an uplink bandwidth allocated by the OLT, and the uplink bandwidth carrying a specified receiving optical power value range — S302

The ONU sends registration information to the OLT using the uplink bandwidth in response to determining that a receiving optical power value of the ONU matches the specified receiving optical power value range — S304

(56) References Cited

FOREIGN PATENT DOCUMENTS

EP         1109336 A1    6/2001
WO    2018166381 A1    9/2018

* cited by examiner

RANGING METHOD AND REGISTRATION METHOD FOR OPTICAL NETWORK, OLT, ONU, AND OPTICAL NETWORK SYSTEM

CROSS-REFERENCE TO RELATED APPLICATIONS

The present disclosure claims priority to Chinese Patent Application No. 201811115958.X, filed to the China Patent Office on Sep. 25, 2018, the disclosure of which is hereby incorporated by reference in its entirety.

TECHNICAL FIELD

The present disclosure relates, but is not limited, to the field of communications.

BACKGROUND

With the development of a network technology, a large number of services such as voice, data and video may be transmitted over a network. Therefore, the requirement for bandwidth is continuously improved, and a Passive Optical Network (PON) is generated under this demand.

FIG. 1 is a topological structure diagram of a PON system in the related art. As shown in FIG. 1, the PON system is generally composed of an Optical Line Terminal (OLT) at a local side, an Optical Network Unit (ONU) at a user side, and an Optical Distribution Network (ODN), and generally adopts a point-to-multipoint network structure. The ODN is composed of passive optical devices such as single-mode optical fibers, optical splitters and optical connectors, and provides a optical transmission medium for a physical connection between the OLT and the ONU. At present, the development of low-delay services such as virtual reality services and 5G wireless services raises low-delay demands for the PON.

SUMMARY

According to an aspect of embodiments of the present disclosure, a ranging method for an optical network is provided, which may include that: an OLT broadcasts a downlink optical signal, the downlink optical signal carrying a specified receiving optical power value range, and an uplink bandwidth corresponding to the specified receiving optical power value range; the OLT receives an uplink optical signal sent by an ONU to be registered, the uplink optical signal being sent to the OLT over an uplink bandwidth corresponding to the specified receiving optical power value range by the ONU to be registered in response to determining that a receiving optical power value of the downlink optical signal arriving at the ONU to be registered is within the specified receiving optical power value range, and the uplink optical signal carrying the receiving optical power value; and the OLT determines an optical fiber distance between the ONU to be registered and the OLT according to the receiving optical power value.

According to another aspect of the embodiments of the present disclosure, another ranging method for an optical network is provided, which may include that: an ONU to be registered receives a downlink optical signal broadcast by an OLT, the downlink optical signal carrying a specified receiving optical power value range, and an uplink bandwidth corresponding to the specified receiving optical power value range; the ONU to be registered determines a receiving optical power value of the downlink optical signal arriving at the ONU to be registered; and the ONU to be registered sends an uplink optical signal to the OLT over the uplink bandwidth in response to determining that the receiving optical power value is within the specified receiving optical power value range, the uplink optical signal carrying the receiving optical power value, so that the OLT determines an optical fiber distance between the ONU and the OLT according to the receiving optical power value.

According to yet another aspect of the embodiments of the present disclosure, a registration method for an optical network is provided, which may include that: an OLT groups ONUs controlled by the OLT according to receiving optical power values of the ONUs; and the OLT allocates corresponding uplink bandwidths to the ONUs in different groups, the uplink bandwidths being used to send registration information by the ONUs to be registered.

According to yet another aspect of the embodiments of the present disclosure, another registration method for an optical network is provided, which may include that: an ONU receives a broadcast message sent by an OLT, the broadcast message carrying an uplink bandwidth allocated by the OLT, and the uplink bandwidth carrying a specified receiving optical power value range; and the ONU sends registration information to the OLT using the uplink bandwidth in response to determining that a receiving optical power value of the ONU matches the specified receiving optical power value range.

According to another aspect of the embodiments of the present disclosure, an OLT is provided, which may include: a grouping module, configured to group ONUs controlled by the OLT according to receiving optical power values of the ONUs; and an allocation module, configured to allocate corresponding uplink bandwidths to the ONUs in different groups, the uplink bandwidths being used to send registration information by the ONUs to be registered.

According to another aspect of the embodiments of the present disclosure, an ONU is provided, which may include: a receiving module, configured to receive a broadcast message sent by an OLT, the broadcast message carrying an uplink bandwidth allocated by the OLT, and the uplink bandwidth carrying a specified receiving optical power value range; and a sending module, configured to send registration information to the OLT using the uplink bandwidth in response to determining that a receiving optical power value of the ONU matches the specified receiving optical power value range.

According to another aspect of the embodiments of the present disclosure, an optical network system is provided, which may include: an OLT and an ONU. The OLT may be configured to group ONUs controlled by the OLT according to receiving optical power values of the ONUs, and allocate corresponding uplink bandwidths to the ONUs in different groups, the uplink bandwidths being used to send registration information by the ONUs to be registered. The ONU may be configured to: receive a broadcast message sent by the OLT, the broadcast message carrying an uplink bandwidth allocated by the OLT, and the uplink bandwidth carrying a specified receiving optical power value range; and send registration information to the OLT using the uplink bandwidth when a receiving optical power value of the ONU matches the specified receiving optical power value range.

According to another aspect of the embodiments of the present disclosure, a computer-readable storage medium is provided. A computer program may be stored thereon. The computer program may be configured to, when run, perform the ranging method for an optical network or the registration method for an optical network provided in any one of the above aspects.

According to another aspect of the embodiments of the present disclosure, an electronic device is provided. The electronic device may include a memory and a processor. The memory may store a computer program. The processor may be configured to run the computer program to perform the ranging method for an optical network or the registration method for an optical network provided in any one of the above aspects.

DETAILED DESCRIPTION OF THE EMBODIMENTS

Figure 1:
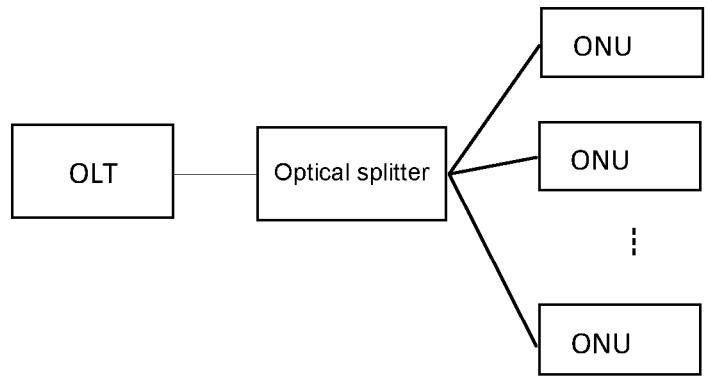
FIG. 1 is a topological structure diagram of a PON system in the related art.

The present disclosure is described below with reference to the drawings and in conjunction with the embodiments in detail. It is to be noted that embodiments in the present application and characteristics in the embodiments may be combined under the condition of no conflicts.

It is to be noted that the specification and claims of the disclosure and the terms "first", "second" and the like in the drawings are used to distinguish similar objects, and do not need to describe a specific sequence or a precedence order.

In the related art, in an ONU registration stage, an OLT needs to perform ranging on an ONU to be registered. Since the OLT does not know a distance from the ONU to be registered to the OLT in advance, the size of a quiet window opened by the OLT for ranging covers a minimum distance to a maximum distance supported by a PON system. A distance difference between the maximum distance and the minimum distance is 20 km or 40 km. In the PON system supporting a differential distance of 20 km, it is recommended in the standard that a loop delay difference value for the nearest ONU and the farthest ONU is 200 μs, a response time difference value for the ONU is 2 μs, and a maximum random delay value for the ONU is 48 μs. Therefore, the size of a recommended quiet window is 250 μs. In the PON system supporting a differential distance of 40 km, it is recommended in the standard that a loop delay difference value for the nearest ONU and the farthest ONU is 400 μs, a response time difference value for the ONU is 2 μs, and a maximum random delay value for the ONU is 48 μs. Therefore, the size of a recommended quiet window is 450 μs. When the OLT opens a quiet window, the OLT does not allocate an uplink bandwidth to a registered ONU, so that the registered ONU cannot send uplink data within time corresponding to the quiet window. If there is a registered ONU for transmitting a low-delay service in the system, the ONU for transmitting the low-delay service cannot tolerate the PON system to open a large quiet window since the large quiet window may lead to the delayed sending of the low-delay service. In the related PON system, the OLT periodically opens a quiet window for ONU registration, so that the PON system cannot meet the low-delay demands of the low-delay service.

In view of this, the embodiments of the present disclosure provide a registration method for an optical network. The method may be applied to an optical network architecture as shown in FIG. 1.

Figure 2:
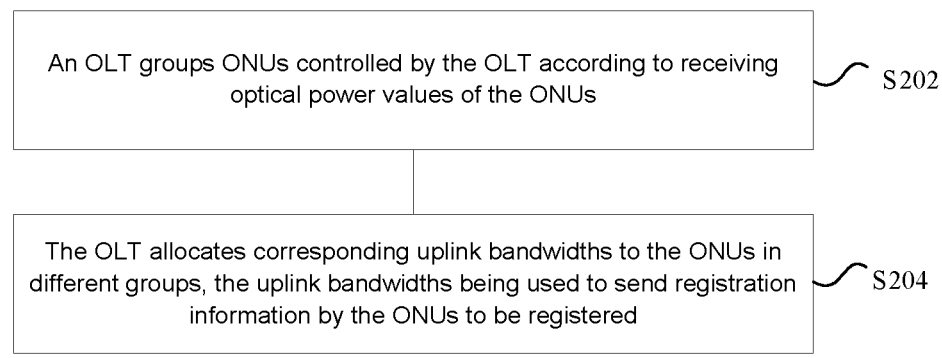
FIG. 2 is a flow diagram of a registration method for an optical network according to an embodiment of the present disclosure.

FIG. 2 is a flow diagram of a registration method for an optical network according to an embodiment of the present disclosure. The method may include steps S202 and S204.

In step S202, an OLT groups ONUs controlled by the OLT according to receiving optical power values of the ONUs.

In step S204, the OLT allocates corresponding uplink bandwidths to the ONUs in different groups, the uplink bandwidths being used to send registration information by the ONUs to be registered.

According to the embodiments provided by the present disclosure, the ONUs controlled by the OLT are grouped, different uplink bandwidths are allocated to the ONUs in each group, and the ONUs to be registered in the group send registration information using the allocated uplink bandwidths. The technical problem of excessive delay caused by opening the quiet window in the related art is solved, and the low-delay demands of service transmission on the link are guaranteed.

According to the embodiments provided by the present disclosure, the operation that the corresponding uplink bandwidths are allocated to the ONUs in different groups may include S11 and S12.

In S11, the OLT determines time periods of uplink optical signals of the ONUs in different groups arriving at the OLT according to the receiving optical power values, each receiving optical power value range corresponding to one ONU group.

In S12, the OLT allocates corresponding uplink bandwidths to each of the time periods respectively, the uplink bandwidths carrying specified receiving optical power value ranges.

According to the embodiments provided by the present disclosure, the operation that the corresponding uplink bandwidths are allocated to the ONUs in different groups may include that corresponding uplink bandwidths are allocated to unregistered ONUs in different groups. Herein, corresponding uplink bandwidths are not allocated to any ONU in a running state within the time period of the uplink optical signal of each group of ONUs arriving at the OLT.

According to the embodiments provided by the present disclosure, after the corresponding uplink bandwidths are allocated to the ONUs in different groups, the method further includes that: registration information sent by the ONUs to be registered using the uplink bandwidths is received; and ranging is performed on the ONUs to be registered according to the registration information.

Figure 3:
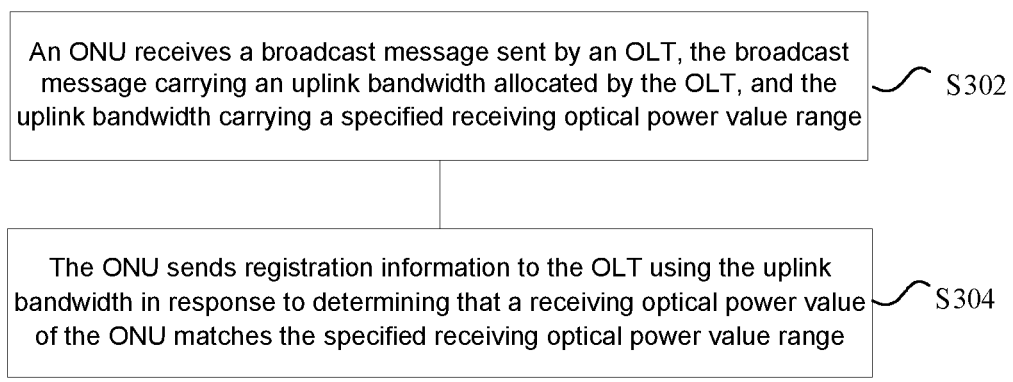
FIG. 3 is a flow diagram of another registration method for an optical network according to an embodiment of the present disclosure.

The embodiments of the present disclosure provide another registration method for an optical network. The method may be applied to an optical network architecture as shown in FIG. 1. FIG. 3 is a flow diagram of another registration method for an optical network according to an embodiment of the present disclosure. The method may include steps S302 and S304.

In step S302, an ONU receives a broadcast message sent by an OLT, the broadcast message carrying an uplink bandwidth allocated by the OLT, and the uplink bandwidth carrying a specified receiving optical power value range.

In step S304, the ONU sends registration information to the OLT using the uplink bandwidth in response to determining that a receiving optical power value of the ONU matches the specified receiving optical power value range.

According to the embodiments provided by the present disclosure, when determining that the specified receiving optical power value range includes the receiving optical power value of the ONU, the ONU determines that the receiving optical power value of the ONU matches the specified receiving optical power value range.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

In the present embodiment, a registration apparatus for an optical network is further provided. The apparatus may include an OLT and an ONU, respectively configured to implement the above embodiments and preferred implementation manners, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

Figure 4:
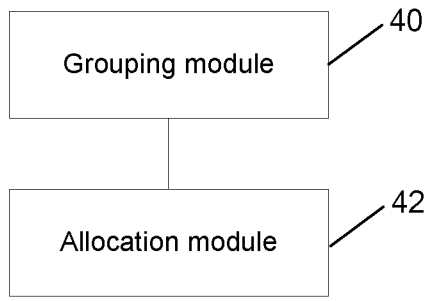
FIG. 4 is a schematic structure diagram of an OLT according to an embodiment of the present disclosure.

As shown in FIG. 4, it is a schematic structure diagram of an OLT according to an embodiment of the present disclosure. The OLT may include: a grouping module 40, configured to group ONUs controlled by the OLT according to receiving optical power values of the ONUs; and an allocation module 42, configured to allocate corresponding uplink bandwidths to the ONUs in different groups, the uplink bandwidths being used to send registration information by the ONUs to be registered.

According to the embodiments provided by the present disclosure, the grouping module 40 may include: a determination unit, configured to determine time periods of uplink optical signals of the ONUs in different groups arriving at the OLT according to the receiving optical power values, each receiving optical power value range corresponding to one ONU group; and an allocation unit, configured to allocate corresponding uplink bandwidths to each of the time periods respectively.

Figure 5:
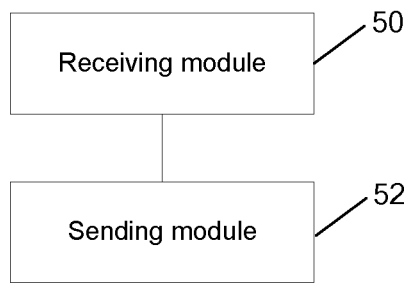
FIG. 5 is a schematic structure diagram of an ONU according to an embodiment of the present disclosure.

As shown in FIG. 5, it is a schematic structure diagram of an ONU according to an embodiment of the present disclosure. The ONU may include: a receiving module 50, configured to receive a broadcast message sent by an OLT, the broadcast message carrying an uplink bandwidth allocated by the OLT, and the uplink bandwidth carrying a specified receiving optical power value range; and a sending module 52, configured to send registration information to the OLT using the uplink bandwidth in response to determining that a receiving optical power value of the ONU matches the specified receiving optical power value range.

According to the embodiments provided by the present disclosure, the sending module 52 may be specifically configured to determine, when determining that the specified receiving optical power value range comprises the receiving optical power value of the ONU, that the receiving optical power value of the ONU matches the specified receiving optical power value range.

The embodiments of the present disclosure further provide an optical network system, which may include the OLT as shown in FIG. 4 and the ONU as shown in FIG. 5.

It is to be noted that each of the above modules may be implemented by software or hardware. For the latter, it may be implemented by, but not limited to, the following manners that the above modules are all located in the same processor; or, the above modules are located in different processors in any combination form respectively.

According to the embodiments provided by the present disclosure, the OLT allocates different uplink bandwidths for sending registration information to different groups of ONUs according to different ranges of optical signal transmission loss values (corresponding to receiving optical power values) with the ONUs. In order to prevent data of registration messages sent by the non-ranging ONUs from colliding with uplink data sent by the completed ONUs, the OLT will not allocate an uplink bandwidth to any registered ONU to form a quiet window when the non-ranging ONUs send the data of the registration messages. The OLT estimates a time period of an uplink optical signal of the ONU arriving at the OLT according to an optical signal transmission loss value range (and a system topology structure) between the OLT and the ONU, and the OLT does not allocate the uplink bandwidth to any registered ONU within the time period to form a smaller quiet window. The influence on low-delay services caused by the fact that the OLT opens a complete quiet window of 250 μs or 450 μs according to a differential distance of the supported ONU of 20 km or 40 km in the related art is solved.

The embodiments of the present disclosure will be described in detail below with reference to a specific example.

When a downlink signal sent by the OLT arrives at the ONU, the downlink signal passes through an optical splitter and an optical fiber, the attenuation of the optical signal after passing through the optical splitter is proportional to the size of a splitting ratio of the optical splitter. As the splitting ratio is larger, the attenuation of the optical signal is greater. The optical splitter with the splitting ratio of 1:2 attenuates the optical signal by 3 dB. The optical splitter with the splitting ratio of 1:4 attenuates the optical signal by 6 dB. The optical splitter with the splitting ratio of 1:8 attenuates the optical signal by 9 dB. The optical splitter with the splitting ratio of 1:16 attenuates the optical signal by 12 dB. The optical splitter with the splitting ratio of 1:32 attenuates the optical signal by 15 dB.

The attenuation of the optical signal passing through the optical fiber is proportional to the length of the optical fiber. As the optical fiber is longer, the attenuation of the optical signal is greater, and the attenuation of the optical signal passing through the optical fiber per kilometer is about 0.3 to 0.5 dB.

Figure 6:
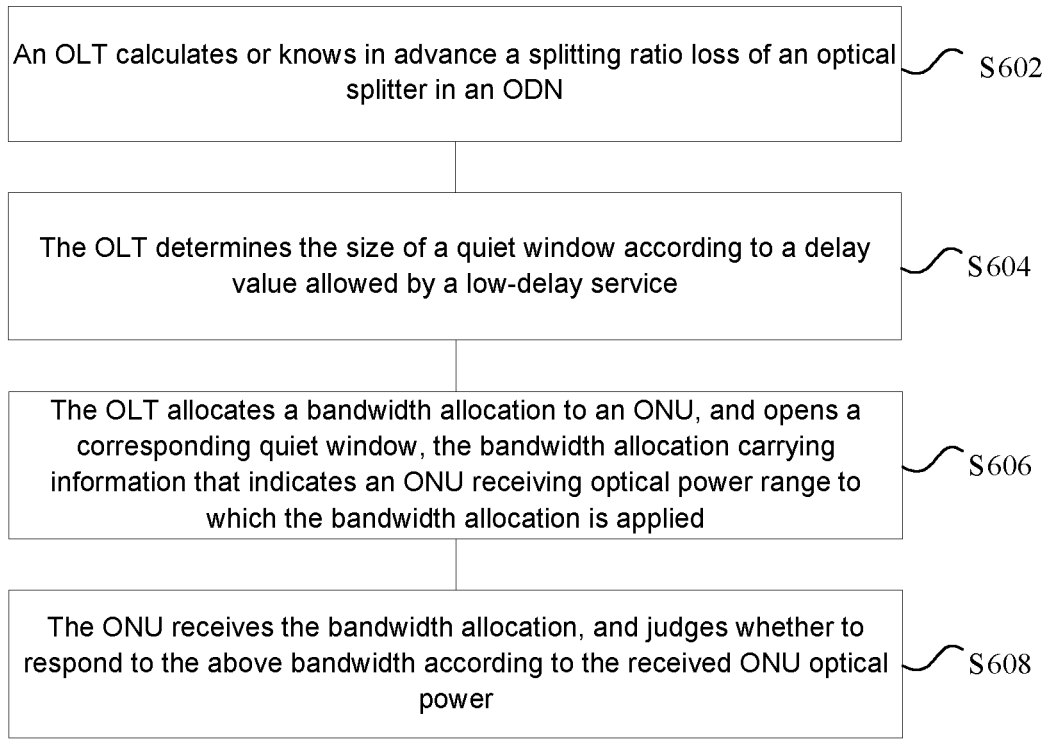
FIG. 6 is an operation flowchart of an OLT and an ONU according to an embodiment of the present disclosure.

FIG. 6 is an operation flowchart of an OLT and an ONU according to an embodiment of the present disclosure. The operation flow of the OLT and the ONU may include steps S602-S608. The OLT may know a splitting ratio of an optical splitter in an ODN in advance. In the present embodiment, it is assumed that the OLT knows the splitting ratio of the optical splitter in the ODN, if the OLT does not know the splitting ratio of the optical splitter, the OLT may open a quiet window of 250 μs according to the conventional art, and allocate an uplink bandwidth to the registered ONU. The OLT sends a downlink optical power value P1 sent by the OLT to the ONU. After receiving the uplink bandwidth, the ONU sends uplink data at an uplink time corresponding to the above bandwidth. The ONU sends an optical power value P2 of a downlink signal received by the ONU to the OLT. The OLT completes the ranging of the ONU according to the conventional art. A value obtained by subtracting time T2 at which the OLT receives data sent by the ONU from time T1 at which the OLT sends the downlink signal, from starting time T1 at which the uplink bandwidth is allocated, and from a random delay value Tr of the ONU is a loop delay of the ONU. An optical fiber length L of the ONU distant from the OLT is obtained by multiplying half of the loop delay value by the speed of the uplink optical signal of the ONU in the optical fiber. The OLT then calculates a loss value of the splitting ratio as P1-P2-L*0.5. After the loss of the splitting ratio is obtained, the ONU may be registered according to the method of the present embodiment.

The OLT may also know a transmitting optical power value of a transmitter of the OLT, subtracts an attenuation value passing through the optical splitter and an attenuation value passing through the optical fiber from the optical power of the downlink signal sent by the OLT, and obtains an optical power value of the downlink signal arriving at the ONU. If a distance between the nearest ONU and the farthest ONU supported by a PON system and the OLT is 0 km to 20 km, assuming that the loss of the optical fiber per kilometer is 0.5 dB, the downlink optical power sent by the OLT is P dBm, and assuming that the splitting ratio of the optical splitter supported by the system is 1:32, the optical power range of the downlink signal sent by the OLT arriving at the ONU is: p-15 to P-15-0.5*20, i.e., P-15 dBm to P-25 dBm.

According to the above relationship, the OLT may calculate an optical fiber distance between the OLT and the ONU according to the optical power value of the downlink optical signal sent by the OLT arriving at the ONU, the OLT may calculate an optical fiber distance range between the OLT and the ONU according to the optical power range value of the downlink optical signal sent by the OLT arriving at the ONU. If the OLT calculates that the distance between the ONU and the OLT is between L1 and L2, the OLT may calculate a time range when the OLT orders the ONU to send an uplink optical signal to arrive at the OLT: L1/C+T1+Tres+Tr to L2/C+T1+Tres+Tr, where T1 is a starting time of the OLT ordering the ONU to send data, C is the speed of the optical signal sent by the ONU in optical fiber transmission, Tres is a response time of the ONU, and Tr is a random delay value of the ONU.

Because the OLT may calculate the optical fiber distance range between the ONU and the OLT according to the optical power value range where the downlink signal arrives at the ONU and then calculate the time range when the uplink optical signal sent by the ONU arrives at the OLT, the OLT may separately allocate uplink bandwidths to the ONUs that receives different downlink signal optical power ranges for registration, and simultaneously open a reduced quiet window (smaller than a quiet window of 250 μs or 450 μs supported by a standard technical) for ranging according to the calculated time range when the uplink optical signal sent by the ONU arrives at the OLT.

The main steps of the OLT and the ONU sending and receiving data may include steps 1-3.

In step 1, the OLT sends a broadcast message to the ONU. The message content is that the received optical power value of the downlink optical signal is bandwidth allocation for registration of the ONU in a specific range (the specific range is that the optical power value of the downlink optical signal received by the ONU is less than P1, or greater than or equal to P1 and less than P2, or greater than or equal to P2 and less than P3, or greater than or equal to P3 and less than P4, or greater than or equal to P4, where P1, P2, P3 and P4 are specific optical power values). In the present embodiment, the ranges of the optical power values received by the ONUs corresponding to different bandwidths allocated by the OLT do not overlap. In other embodiments, the overlapping of the ranges of the optical power values received by the ONUs corresponding to different bandwidths allocated by the OLT may also be considered. For example, the specific range is that the optical power value of the downlink optical signal received by the ONU is smaller than P1, or greater than P2 and less than P3, where P2 is less than P1, or greater than P4 and less than P5, P4 is less than P3, or greater than P6 and less than P7, and P6 is less than P5, or greater than P7.

In the present example, the OLT may send one of the above-mentioned bandwidth allocations once selectively. For example, the OLT allocates a first bandwidth allocation to the ONU in which the received optical power value of the downlink optical signal is less than P1. The OLT then sends a second bandwidth allocation after a period of time such as 125 μs. For example, the OLT allocates the second bandwidth allocation to the ONU in which the received optical power value of the downlink optical signal is greater than P1 and less than P2. By parity of reasoning, the OLT finally allocates a fifth bandwidth allocation to the ONU in which the received optical power value of the downlink optical signal is greater than P7. In the present embodiment, the OLT allocates five of the above-mentioned bandwidths in one cycle. In other embodiments, the OLT may allocate more bandwidth allocations in one cycle selectively. The size and number of the opened quiet windows corresponding to each allocated bandwidth depend on the demands of low-delay services supported by the system, and the size of the quiet windows opened by the OLT is smaller than the allowed delay requirements of the low-delay services supported by the system. For example, the size of the quiet window of 200 us in the conventional art corresponds to a differential distance of the ONU of 20 km, the size of the quiet window which can be accepted by the low-delay service is 10 μs, and 10 μs corresponds to the differential distance of the ONU of 1 km. If the differential distance supported by the PON system is 20 km, the OLT needs to allocate a total of 20 quiet windows of 10 μs to all ONUs, and each quiet window corresponds to one uplink bandwidth allocation. 20 different uplink bandwidths need to correspond to optical power ranges of 20 ONUs for receiving downlink signals. The optical power ranges are: less than P1, greater than P1 and less than P2, greater than P2 and less than P3, greater than P3 and less than P4, greater than P4 and less than P5, greater than P5 and less than P6, greater than P6 and less than P7, greater than P7 and less than P8, greater than P8 and less than P9, greater than P9 and less than P10, greater than P10 and less than P11, greater than P11 and less than P12, greater than P12 and less than P13, greater than P13 and less than P14, greater than P14 and less than P15, greater than P15 and less than P16, greater than P16 and less than P17, greater than P17 and less than P18, greater than P18 and less than P19, and greater than P19. The OLT allocates one of the 20 bandwidth allocations in one cycle, an interval between the two bandwidth allocations is a fixed time such as 125 μs, and the OLT repeatedly sends the bandwidth allocations for ONU registration in different cycles. If a lower delay is required, a smaller quiet window may be opened, for example, 5 us, and a corresponding differential distance of the ONU is 0.5 km.

In step 2, if the received optical power value of the downlink optical signal meets the specific range described in step 1, the ONU in the registration state sends uplink data within the bandwidth allocated by the OLT in step 1, and the content of the uplink data is identity information of the ONU, such as a media access address of the ONU or serial number information of the ONU.

In step 3, the OLT calculates a time range t1 to t2 when the uplink optical signal of the ONU in the range arrives at the OLT according to the downlink signal optical power value of the specific range received by the ONU in step 1, the OLT does not allocate bandwidth to any registered ONU within the time range, and a quiet window for ranging the registered ONU is formed. The OLT receives the uplink optical signal sent by the ONU in step 2 in the quiet window, and the OLT performs ranging on the ONU according to the method defined in the PON standard to obtain an accurate ranging result of the ONU.

By repeating the above steps, the OLT may complete the ranging of ONUs in which the received optical power values of downlink optical signals are other specific ranges, and by adopting the above method, the OLT may complete the ranging of all ONUs within the distance range supported by the PON system to complete the registration of the ONUs.

By adopting the method of the present embodiment, the OLT estimates a time period of the uplink optical signal of the ONU arriving at the OLT according to an optical signal transmission loss value range (and a system topology structure) between the OLT and the ONU, and the OLT opens a reduced ranging quiet window according to the time period. The influence of the quiet window on the uplink service of the registered ONU is reduced, and the low-delay demands of service transmission on the uplink are guaranteed.

The embodiments of the present disclosure also provide a computer-readable storage medium. A computer program is stored thereon. The computer program is configured to, when running, perform the steps in any of the above method embodiments.

According to the embodiments of the present disclosure, the storage medium may be configured to store the computer program for performing the following steps. In S1, an OLT groups ONUs controlled by the OLT according to receiving optical power values of the ONUs. In S2, the OLT allocates corresponding uplink bandwidths to the ONUs in different groups, the uplink bandwidths being used to send registration information by the ONUs to be registered.

According to the embodiments provided by the present disclosure, the computer-readable storage medium may include, but is not limited to, various media capable of storing a computer program such as a U disk, a ROM, a RAM, a mobile hard disk, a magnetic disk or an optical disc.

The embodiments of the present disclosure further provide an electronic device. The electronic device includes a memory and a processor. The memory stores a computer program. The processor is configured to run the computer program to perform the steps in any of the above method embodiments.

According to the embodiments of the present disclosure, the electronic device may further include a transmission device and an input-output device. The transmission device is connected to the processor, and the input-output device is connected to the processor.

According to the embodiments of the present disclosure, the processor may be configured to perform the following steps through the computer program. In S1, an OLT groups ONUs controlled by the OLT according to receiving optical power values of the ONUs. In S2, the OLT allocates corresponding uplink bandwidths to the ONUs in different groups, the uplink bandwidths being used to send registration information by the ONUs to be registered.

The specific examples in the embodiments of the present disclosure may refer to the examples described in the above embodiments and alternative implementation manners, and details are not described herein in the present embodiment.

It is apparent that a person skilled in the art shall understand that all of the above-mentioned modules or steps in the present disclosure may be implemented by using a general calculation apparatus, may be centralized on a single calculation apparatus or may be distributed on a network composed of multiple calculation apparatuses. Optionally, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to the combination of any specific hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A ranging method for an optical network, comprising:
   broadcasting, by an Optical Line Terminal (OLT), a downlink optical signal, the downlink optical signal carrying a specified receiving optical power value range, and an uplink bandwidth corresponding to the specified receiving optical power value range;
   receiving, by the OLT, an uplink optical signal sent by an Optical Network Unit (ONU) to be registered, the uplink optical signal being sent to the OLT over an uplink bandwidth corresponding to the specified receiving optical power value range by the ONU to be registered in response to determining that a receiving optical power value of the downlink optical signal arriving at the ONU to be registered is within the specified receiving optical power value range, and the uplink optical signal carrying the receiving optical power value; and
   determining, by the OLT, an optical fiber distance between the ONU to be registered and the OLT according to the receiving optical power value and a relationship between the receiving optical power value and the optical fiber distance.

2. The method according to claim 1, wherein before the OLT broadcasts the downlink optical signal, the method further comprises:

dividing, by the OLT, a distance range supported by the OLT from a minimum distance to a maximum distance into a plurality of sub-distance ranges;

determining, by the OLT, a receiving optical power value range corresponding to any sub-distance range based on a pre-acquired transmitting optical power value of the downlink optical signal, a pre-acquired power attenuation value of the downlink optical signal passing through an optical splitter, and a pre-acquired power attenuation value of an optical signal passing through each kilometer of optical fiber; and allocating, by the OLT, a corresponding uplink bandwidth to any sub-distance range.

3. The method according to claim 2, wherein determining, by the OLT, the optical fiber distance between the ONU to be registered and the OLT according to the receiving optical power value comprises:

determining, by the OLT, a power attenuation value of the downlink optical signal arriving at the ONU to be registered according to a difference value between the pre-acquired transmitting optical power value of the downlink optical signal and the receiving optical power value;

determining, by the OLT, a power attenuation value of the downlink optical signal passing through an optical fiber between the ONU to be registered and the OLT according to a difference value between the power attenuation value and the pre-acquired power attenuation value of the downlink optical signal passing through the optical splitter; and determining, by the OLT, an optical fiber distance between the ONU to be registered and the OLT according to a ratio of the power attenuation value of the downlink optical signal passing through the optical fiber between the ONU to be registered and the OLT to the pre-acquired power attenuation value of the optical signal passing through each kilometer of optical fiber.

4. An electronic device, comprising a memory and a processor, wherein the memory stores a computer program, and the processor is configured to run the computer program to perform the method as claimed in claim 3.

5. The method according to claim 2, further comprising:

determining, by the OLT, a distance range from the ONU to be registered to the OLT according to the specified receiving optical power value range; and estimating, by the OLT, a time period when the uplink optical signal sent by the ONU to be registered arrives at the OLT according to the distance range between the ONU to be registered and the OLT;

wherein the OLT does not allocate an uplink bandwidth corresponding to the specified receiving optical power value range to any registered ONU within the time period.

6. An electronic device, comprising a memory and a processor, wherein the memory stores a computer program, and the processor is configured to run the computer program to perform the method as claimed in claim 5.

7. An electronic device, comprising a memory and a processor, wherein the memory stores a computer program, and the processor is configured to run the computer program to perform the method as claimed in claim 2.

8. The method according to claim 1, wherein the uplink optical signal also carries identity information of the ONU to be registered; and the method further comprises:

registering, by the OLT, the ONU to be registered according to the identity information of the ONU to be registered.

9. An electronic device, comprising a memory and a processor, wherein the memory stores a computer program, and the processor is configured to run the computer program to perform the method as claimed in claim 8.

10. The method according to claim 1, further comprising:

grouping, by an Optical Line Terminal (OLT), Optical Network Units (ONUs) controlled by the OLT according to receiving optical power values of the ONUs; and allocating, by the OLT, corresponding uplink bandwidths to the ONUs in different groups, the uplink bandwidths being used to send registration information by the ONUs to be registered;

wherein allocating, by the OLT, the corresponding uplink bandwidths to the ONUs in different groups comprises:

allocating, by the OLT, corresponding uplink bandwidths to unregistered ONUs in different groups, wherein corresponding uplink bandwidths are not allocated to any ONU in a running state within the time period of the uplink optical signal of each group of ONUs arriving at the OLT, so as to form a reduced quiet window.

11. The method according to claim 10, wherein allocating, by the OLT, the corresponding uplink bandwidths to the ONUs in different groups comprises:

determining, by the OLT, time periods of uplink optical signals of the ONUs in different groups arriving at the OLT according to the receiving optical power values, each receiving optical power value range corresponding to one ONU group; and allocating, by the OLT, corresponding uplink bandwidths to each of the time periods respectively, the uplink bandwidths carrying specified receiving optical power value ranges.

12. The method according to claim 10, wherein after the OLT allocates the corresponding uplink bandwidths to the ONUs in different groups, the method further comprises:

receiving, by the OLT, registration information sent by the ONUs to be registered using the uplink bandwidths; and ranging, by the OLT, the ONUS to be registered according to the registration information.

13. An electronic device, comprising a memory and a processor, wherein the memory stores a computer program, and the processor is configured to run the computer program to perform the method as claimed in claim 10.

14. A non-transitory storage medium, storing a computer program that is configured to, when run, perform the method as claimed in claim 1.

15. An electronic device, comprising a memory and a processor, wherein the memory stores a computer program, and the processor is configured to run the computer program to perform the method as claimed in claim 1.

* * * * *